United States Patent [19]

Blewett

[11] Patent Number: 5,896,532
[45] Date of Patent: Apr. 20, 1999

[54] OBJECTS WITH RUN-TIME CLASSES AND METHODS OF MAKING THEM

[75] Inventor: Charles Douglas Blewett, Madison, N.J.

[73] Assignee: Lucent Technologies Inc., Murray Hill, N.J.

[21] Appl. No.: 07/898,251

[22] Filed: Jun. 15, 1992

[51] Int. Cl.$^6$ ............................................. G06F 9/44
[52] U.S. Cl. ................................... 395/680; 395/701
[58] Field of Search .................... 395/157, 650, 395/700, 670, 682, 683, 685, 701, 704, 712; 364/280, 284, 286, 976, 977, 977.1

[56] References Cited

U.S. PATENT DOCUMENTS

| | | | |
|---|---|---|---|
| 5,093,914 | 3/1992 | Coplien et al. | 395/700 |
| 5,133,075 | 7/1992 | Risch | 395/800 |
| 5,206,951 | 4/1993 | Khoyi et al. | 395/650 |
| 5,230,072 | 7/1993 | Smith et al. | 395/600 |
| 5,280,610 | 1/1994 | Travis, Jr. et al. | 395/600 |
| 5,339,392 | 8/1994 | Risberg et al. | 395/161 |
| 5,421,016 | 5/1995 | Conner et al. | 395/700 |
| 5,446,902 | 8/1995 | Islam | 395/700 |

FOREIGN PATENT DOCUMENTS 2242293  9/1991  United Kingdom .

OTHER PUBLICATIONS

Asente et al., "X Window System Toolkit, The Complete Programmer's Guide and Specification" Digital Press, Dec. 1990.

Konstan et al., "Developing a GUIDE Using Object-Oriented Programming", OOPSLA '91, pp. 75–88, Dec. 1991.

Keene, T. "Developing X–Window Apps", Unix Today, p. 44, Nov. 1990.

Open Software Foundation, "OSF/MOTIF™ Programmer's Guide" pp. 8–49, 1991.

Munsch et al., "HP IVI Application Program Interface Design" pp. 21–31, Hewlett Packard Journal, Oct. 1990.

Brazille, et al. "The Object Interface Library", C++ Report pp. 18–24, 1991.

(List continued on next page.)

Primary Examiner—Robert W. Beausoliel, Jr.
Assistant Examiner—Stephen C. Elmore

[57] ABSTRACT

Techniques for defining object classes at run time which are indistinguishable from object classes compiled at compile time. The techniques are applied to widgets employed in X window systems. Further disclosed are new kinds of widgets. One of the new kinds is a widget which has monitor functions associated with specific resources. When the resource is accessed, the monitor function is executed. Another is a widget which has a callback tester function associated with a list of callback functions. The callback tester performs a test whenever any resource of the widget is modified, and if the test succeeds, the functions on the list of callback functions are invoked. Other kinds of widgets are adapted to representing servers and clients. In these widgets, resources represent interprocess communications and operations on the resources are related to the interprocess communication.

22 Claims, 8 Drawing Sheets

OTHER PUBLICATIONS

"Developing Software Using X Windows", Watson, T.A., Mar. 2, 1990 "Evaluating Alternative Display Sharing System", Fitzgerald, P.F., Apr. 19, 1991.

"Designing Uses Interface Tools for the X Window System", McGregor, S., Mar. 3, 1989.

"OSF Motif: The User Interface Standard", Oldenburg, H., Nov. 17, 1989.

"X-related Graphical User Interfaces: A Design Team's Experience", Barker et al. Nov. 8, 1990.

"Validation of Motif Graphical User Interface Widget Set", Birjandi et al., Jan. 11, 1991.

"Dynamic Reassociation of a Subclass with a Superclass", *IBM Technical Disclosure Bulletin*, vol. 33, No. 10A, Mar. 1991, p. 311, XP110057.

Brad A. Myers, et al., "Environment for Rapidly Creating Interactive Design Tools", *The Visual Computer*, vol. 8, No. 2, Feb. 1992, pp. 94–116.

"3D GL Widget Callbacks for Default Enqueued GL Devices", *Research Disclosure*, No. 326, Jun. 1991, Emsworth, GB.

Brad A. Myers, "Separating Application Code From Toolkits: Eliminating the Spaghetti of Call-backs", *Proc. of the ACM Symposium on User Interface Software and Technology*, Nov. 11, 1991, Washington, pp. 211–220.

Chris D. Peterson, "The Athena Widge Set—C Language Interface," *X Window System, X Version 11, Release 4*, 1989, pp. 103–106.

FIG. 3
(PRIOR ART)
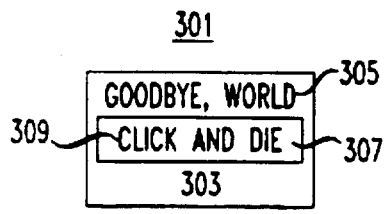
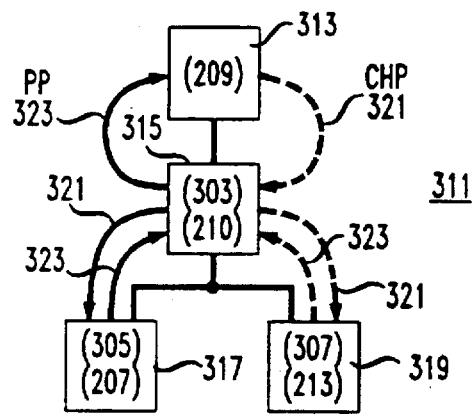
FIG. 4
(PRIOR ART)
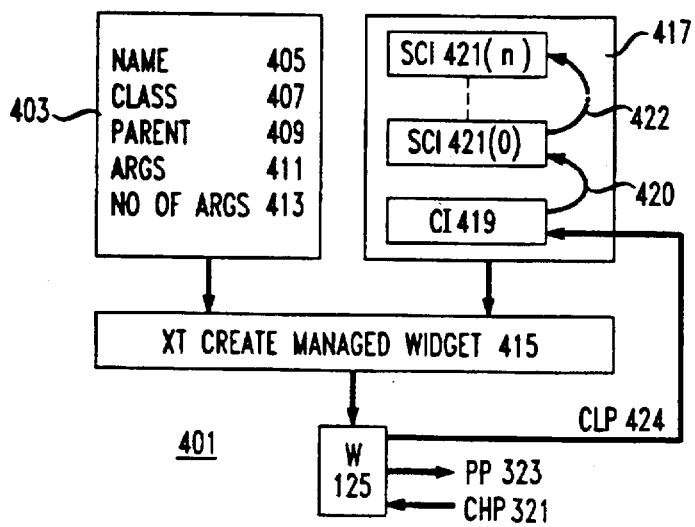
FIG. 11
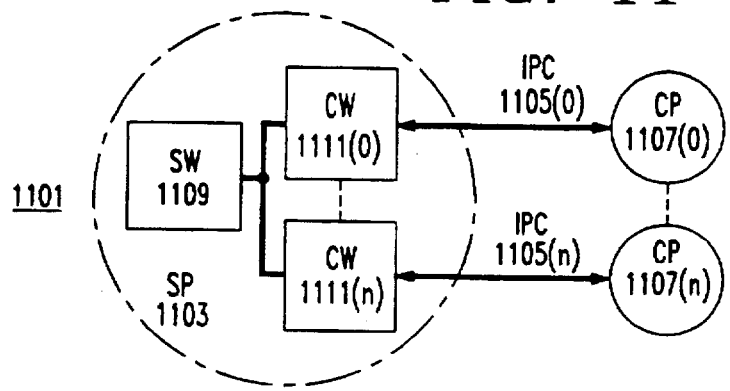

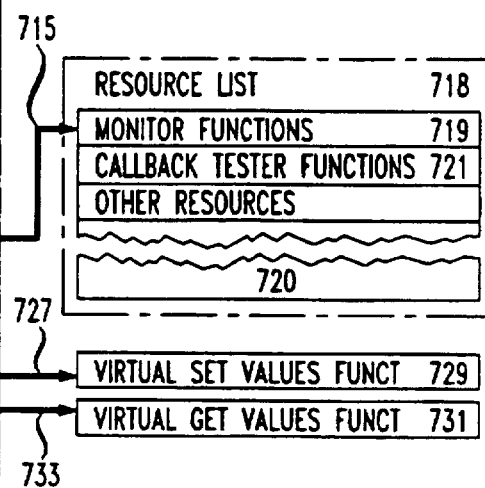
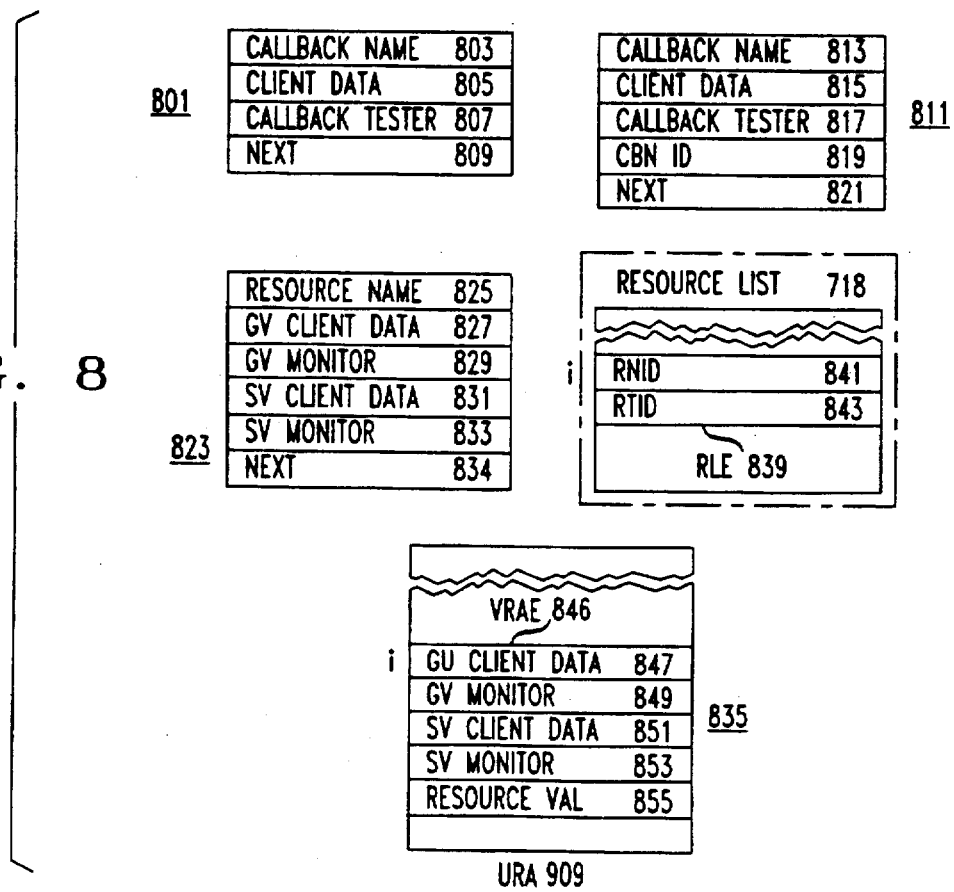
FIG. 7
FIG. 8

FIG. 12

| Name | Type | Default | Description |
|---|---|---|---|
| Server Setup Resources | | | |
| XtNserverHostName | XtRString | NULL | Hostname in lieu of lookup |
| XtNserverEnvironmentName | XtRString | "XIPC" | IPC magic cookie |
| Server Callbacks | | | |
| XtNserverNewClient | XtRCallbackList | NULL | Callback for new clients |
| XtNserverDeadClient | XtRCallbackList | NULL | Callback for dead clients |
| XtNserverRecvMessage | XtRCallbackList | NULL | Callback for incoming messages |
| Server Visible Data Structures | | | |
| XtNserverPointer | XtRString | NULL | The server data structure |
| Incoming Message | | | |
| XtNserverInMessageType | XtRInt | NULL | type field |
| XtNserverInMessageClientId | XtRInt | NULL | client ID |
| XtNserverInMessageLength | XtRInt | NULL | message buffer length |
| XtNserverInMessageBuffer | XtRString | NULL | the message buffer |
| Outgoing Message | | | |
| XtNserverOutMessageType | XtRInt | NULL | type field |
| XtNserverOutMessageClientId | XtRInt | NULL | client ID |
| XtNserverOutMessageLength | XtRInt | NULL | message buffer length |
| XtNserverOutMessageBuffer | XtRString | NULL | the message buffer |

1201

1202 Server Setup Resources
1203 XtNserverHostName
1205 XtNserverEnvironmentName
1206 Server Callbacks
1207 XtNserverNewClient
1209 XtNserverDeadClient
1211 XtNserverRecvMessage
1212 Server Visible Data Structures
1213 XtNserverPointer
1214 Incoming Message
1215 XtNserverInMessageType
1217 XtNserverInMessageClientId
1219 XtNserverInMessageLength
1221 XtNserverInMessageBuffer
1222 Outgoing Message
1223 XtNserverOutMessageType
1225 XtNserverOutMessageClientId
1227 XtNserverOutMessageLength
1229 XtNserverOutMessageBuffer

| Name | Type | Default | Description |
|---|---|---|---|
| Process Setup Resources | | | |
| XtNprocessCommand | XtRString | NULL | sh -c <command string> & |
| XtNprocessIDString | XtRString | NULL | ID string for this process |
| Process Callbacks | | | |
| XtNprocessDeadClient | XtRCallbackList | NULL | Callback for dead client |
| XtNprocessRecvMessage | XtRCallbackList | NULL | Callback for incoming messages |
| Process Visible Data Structures | | | |
| XtNprocessPointer | XtRPointer | NULL | The client data structure |
| Incoming Message (from this process) | | | |
| XtNprocessInMessageType | XtRInt | NULL | type field |
| XtNprocessInMessageClientId | XtRInt | NULL | client ID |
| XtNprocessInMessageLength | XtRInt | NULL | message buffer length |
| XtNprocessInMessageBuffer | XtRString | NULL | the message buffer |
| Outgoing Message (to this process) | | | |
| XtNprocessOutMessageType | XtRInt | NULL | type field |
| XtNprocessOutMessageLength | XtRInt | NULL | message buffer length |
| XtNprocessOutMessageBuffer | XtRString | NULL | the message buffer |

1303 — Process Setup Resources
1305 — Process Callbacks
1307 — Process Visible Data Structures
1309 — Incoming Message
1311 — Outgoing Message
1301

FIG. 13

OBJECTS WITH RUN-TIME CLASSES AND METHODS OF MAKING THEM

BACKGROUND OF THE INVENTION

1. Field of the Invention

The invention generally concerns systems which are constructed using programs organized around objects and more particularly concerns objects whose classes are defined at compile time. In an embodiment of the invention, the objects are widgets of the type employed in the X Window graphical user interface system.

2. Description of the Prior Art

Two approaches have generally been used in the prior art to create systems for executing applications. The first approach has been to write a single program for the entire application; for example, a payroll application might be written as a single COBOL program.

The second approach has been to use a set of cooperating processes to create the application. In this context, a process is an instance of a program in execution. For example, the payroll application might employ a first program executing in one process to collect the data, a second program executing in another process to sort the data, a third program executing in a third process to update the payroll records, a fourth program executing in a fourth process to print the payroll records, and so on. Communication between the cooperating processes is by means of inter-process communications. The second approach has several important advantages over the first. To begin with, the programs executed in the processes are often standard utility programs, instead of custom-made programs, and it is generally faster and cheaper to combine such standard utility programs than it is to write new code. Further, the second approach is better adapted to systems having more than one processing unit: each of the processes can can run on a different processing unit, and if the application is of the right kind, the programs can be executing in the processes in parallel. Finally, since the processes communicate by means of inter-process communications, the applications are easily adapted to distributed systems, i.e., multi-processor systems in which the processors are in different locations.

A problem for the technique of creating an application as a set of cooperating processes has been the increased use of objects to organize programs. An object is an entity operated on by a program. Whenever the program operates on the object, it must do so using a set of operations defined for the object. The chief advantage of using objects to organize programs is that an object can be dealt with as a logical entity in the program, without regard to the manner in which the logical entity is actually implemented. For example, as a logical entity, a queue has four operations: creating the queue, destroying the queue, adding a value to the tail of the queue, and taking a value from the head of the queue. If a program only uses those operations on the data structure representing the queue, then the data structure may be changed without affecting other parts of the program.

In many object-based programming systems, objects have classes. An object's class is the set of operations defined for the object. For instance, an object upon which the operations of creation, destruction, adding a value to the tail, and taking a value from the head can be performed is an object of class queue. Classes may stand in hierarchical relations with other classes. For example, a program may require a queue upon which not only the four operations listed above can be performed, but also an additional operation: finding the number of items presently in the queue. The addition of the new operation results in a new class of queue objects. Since the new class has all of the operations of the original queue class, the new class is a subclass of the original queue class and the original queue class is a superclass of the new queue class.

The hierarchy may be many levels deep. Each class in the hierarchy is a subclass of all of the classes between it and the first class in the hierarchy and a superclass of all classes below it in the hierarchy. Further, a subclass inherits all of the operations defined for all of its superclasses, i.e., an operation defined for any of the superclasses can be performed on objects of the subclass. Inheritance greatly increases the efficiency of programming with objects, since all that is required to define a new object class is a definition of the new operations; all of the inherited operations are defined in the superclasses.

There are two reasons why object-oriented programming conflicts with the technique of creating an application as a set of cooperating programs. The first reason is that an object's class is defined at compile time, that is, at the time that the source code for the program is translated into object code which can be executed by an actual computer system. The technique of creating an application as a set of cooperating processes, on the other hand, often requires that the cooperating processes must be able to create objects whose class is defined at run time, that is, when the application is actually executed by the computer system.

The second reason is the difficulty of communicating with processes in programs written using the X Window graphical user interface system. The X Window system uses objects called widgets. Unfortunately, the class hierarchy for widgets does not include operations which permit easy communication with processes, and consequently, the X Window graphical user interface system cannot be used with applications implemented as cooperating procedures.

It is an object of the invention disclosed herein to solve these and other problems of object-based programming systems generally and of the X Window system in particular.

SUMMARY OF THE INVENTION

In one aspect, the invention is apparatus employed in an object-based programming system for defining a first object class which is a subclass of a second object class, the apparatus being characterized in that the second object class is defined at compile time and the apparatus includes means for defining the first object class at run time in a fashion such that the first object class appears to the object-based programming system to have been defined at compile time.

In another aspect, the invention is a widget for use in the X window system, the widget being characterized in that the widget includes a resource which is defined when the widget is created, as well as a method of making such a widget.

In still another aspect, the invention is a widget for use in the X window system which is characterized in that the widget includes among its resources a monitor function which is associated with a given one of the resources and which is invoked when the given resource is accessed.

In a further aspect, the invention is a widget for use in the X window system which is characterized in that the widget includes among its resources a callback tester function which is associated with a given callback function and which is invoked when any of the resources is modified to perform a test and invoke the given callback function if the results of the invocation of the callback tester function so indicate.

In an additional aspect, the invention is a widget for use in the X window system which is characterized in that the widget includes resources representing an interprocess communication and means for relating operations on the resources to the interprocess communication.

The foregoing and other objects, aspects, and advantages of the invention will be apparent to one of ordinary skill in the art who peruses the following Drawing and Detailed Description, wherein:

BRIEF DESCRIPTION OF THE DRAWING

FIG. 3 is a diagram of a window in a prior art X Window system and the widget tree corresponding to the window;

FIG. 4 is a diagram of the creation of a widget with a compile-time class in a prior-art X window system;

FIG. 7 is a diagram of run-time class information 521;

FIG. 8 is a diagram of data structures of a preferred embodiment;

FIG. 11 is a diagram showing server and client processes and their corresponding widgets;

FIG. 12 is a diagram of the resources in a server class;

FIG. 13 is a diagram of the resources in a process class; and

Figure 1:
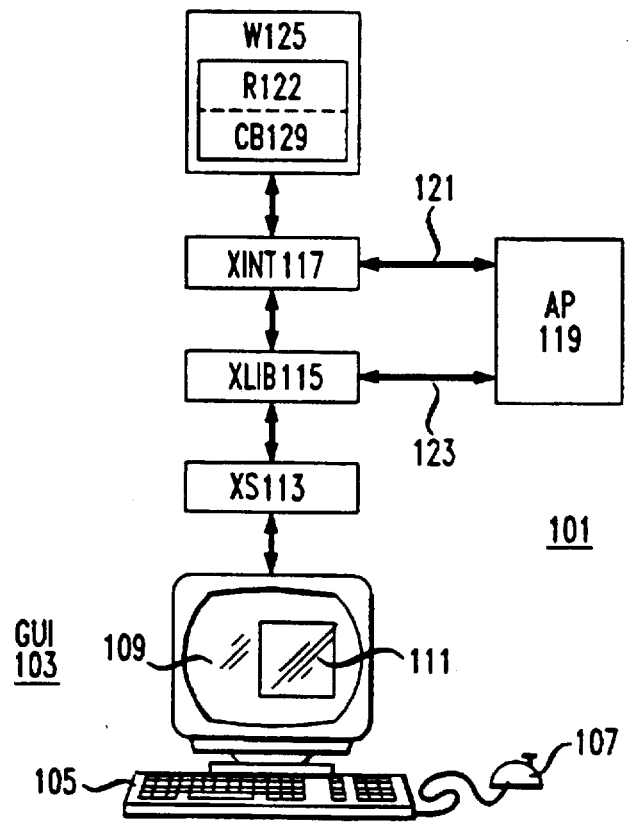
FIG. 1 is a diagram of a prior-art X Window system.

The reference numbers employed in the Drawing and the Detailed Description have three or more digits. The two least significant digits are a number within a figure; the remaining digits are the figure number. Thus, the element with the reference number "305" is first shown in FIG. 3.

DETAILED DESCRIPTION

A preferred embodiment of the invention is implemented in the X-window system. The following Detailed Description will consequently begin with an overview of the X window system and of widgets, will then disclose how virtual widgets may be constructed, that is, widgets whose class is defined at runtime, will thereupon disclose how widgets may be made in which a monitor function is invoked in response to an access of a resource or a callback tester function is invoked in response to any modification of the resources to determine whether a callback procedure associated with the callback tester function is to be invoked, and will finally disclose how virtual widgets having that property may be used to control cooperating processes.

Overview of the X-Window System: FIG. 1

The X window system is a well-known and popular system for controlling a graphical user interface (GUI). A graphical user interface is an interface to a computer system which features active graphical elements such as windows, menus, icons, and the like. A user of the graphical user interface controls the computer system by performing operations on the elements of the graphical user interface. The operations are typically performed by means of a pointing device such as a mouse or stylus. For example, an icon may represent a program in the graphical user interface. To run the program, the user uses the mouse to select and activate the icon.

Those elements of the X-window system which are relevant to the present discussion are described in Paul J. Asente, Ralph R. Swick, *X Window System Toolkit, The Complete Programmer's Guide and Specification*, Digital Equipment Corporation, 1990. That work is hereby incorporated by reference into this patent application. FIG. 1 presents an overview of an X Window system 101. System 101 controls graphical user interface 103, which in turn has three main components: display 109, keyboard 105, and pointing device 107. Display 109 is occupied by one or more windows 111. A window 111 is simply an area of screen 109 with which a user of graphical interface 103 interacts. Windows 111 may contain other windows. For example, a window 111 for a text editor may contain a window in which the text being edited is displayed, a window 111 which is a scroll bar, and windows 111 which are "buttons" specifying editing operations.

Graphical user interface 103 is controlled by X server (XS) 113, which executes on the processor to which display 109, keyboard 105, and pointing device 107 are connected. X server 113 performs the operations actually necessary to produce the the display on display 109 and further responds to input from pointing device 107 and keyboard 105 to move the cursor and display characters on display 109. X server 113 received data from and provides data to routines in X library 115. X library 115 turns the primitive interface to graphical user interface 103 provided by X server 113 into a higher-level interface; that is, programmers can use the routines in X library 115 to deal with display 109 and input devices 105 and 107 in terms of windows and input events.

A still higher level of interface is provided by X intrinsics 117, which provide an interface in which windows in display 109 are represented by objects termed widgets. An application program 119 performs operations on windows 111 in display 109 by using routines in X intrinsics 117 to perform operations on the widget (W) 125 representing the window. Routines in X intrinsics 117 are further invoked in response to a change in the state of window 111 represented by the widget, and those routines operate on widget 125 as required by the change in state in the window.

In the widget interface provided by X intrinsics 117, communication between an application program 119 and a widget 125 is by means of resources 127 in the widget 125. Resources are simply data values in widget 125 which can be read and written by application program 119. Included in resources 127 are callbacks 129, which are lists of routines in application program 119. X intrinsics 117 automatically invokes routines in callbacks 129 in response to changes in the state of widget 125.

Operation of system 101 is as follows: Applications program 119 can either create widgets 125 and use the widget operations provided by X intrinsics 117 to control windows 111 or it can use the routines in X library 115 directly, as shown by arrows 121 and 123 respectively. Only the first case is important to the present discussion. Once application program 119 has used X intrinsics routines to create a widget 125 and associate the widget with a window 111, application program 119 controls the widget 125 and thereby the window 111 by reading and setting values in resources 127. Routines in X intrinsics 117 then use the values of resources 127 when they control the window corresponding to widget 125 by means of routines in X library 115; similarly, when a change of state in window 111 results in a return of a value reflecting the change from GUI 103 to X server 113, X library 115, and finally to X intrinsics 117, routines in X intrinsics 117 change the values of resources 127 and/or invoke callback routines 129 as required by the change of state. For example, the resources of a window 111 include the position of the window in display 109; if the window 111 is moved by a user of graphical user interface 103, X intrinsics 117 will update the position resources to indicate the new position.

Figure 2:
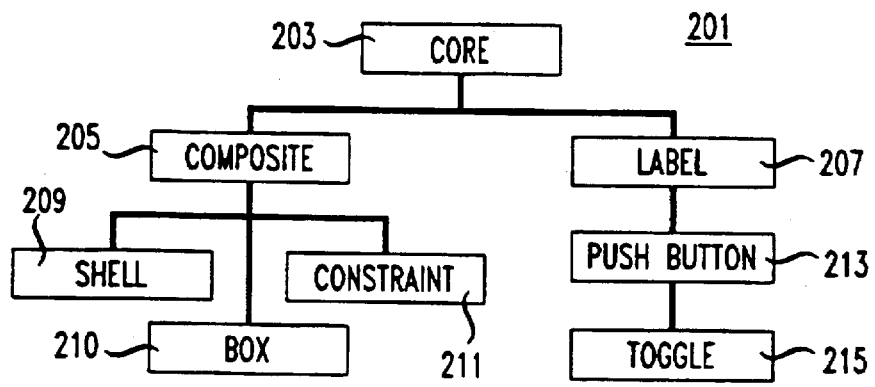
FIG. 2 is a diagram of a prior-art hierarchy of widget classes in an X Window system.

Widgets 125 belong to classes and the classes form a hierarchy. FIG. 2 shows a typical hierarchy 201 of widget classes. All widget classes are subclasses of core class 203, which is defined by X intrinsics 117. At the next level down are the composite class 205 and the label class 207. Composite class 205 is another class defined by X intrinsics 117. A widget 125 must belong to a subclass of the composite class if the window 111 which the widget 125 represents contains another window. Label class 207 is a class whose widgets display labels. Subclasses of label 207 include pushbutton 213. Windows 111 represented by widgets of pushbutton class 213 not only have labels, but can be activated by the user of the graphical interface. When the window is activated, some kind of response results. Toggle class 215 is a subclass of pushbutton 213; widgets with that class represent windows which represent "on-off" pushbuttons.

Subclasses of the composite class include another X-intrinsics defined class, the shell class 209. Widgets with the shell class represent a window which exists only to contain other windows. Other subclasses are box class 210 and constraint class 211. Widgets with the box class represent a window which forms a box in the display; widgets having subclasses of the constraint class may define constraints for the windows they represent. Constraint class 211 is another class which is defined by X intrinsics 117.

A widget 125 belonging to a subclass inherits all of the attributes of widgets 125 above it in class hierarchy 201. Thus, a widget 125 belonging to toggle class 215 inherits all of the attributes of the pushbutton 213, label 207, and core 203 classes. Among the attributes of a widget's class are its resources 127; consequently, a widget 125 not only has the resources of its own class, but also of any of the classes above that class in the hierarchy.

Widgets belong to widget trees. In the widget tree, any widget whose window is contained in another window is a child of the widget representing the containing window. FIG. 3 shows a window 301 and its widget tree 311. Window 301 is a box 303 which contains a label 305 and a button 307. Widget tree 311 is made up of widget 313, which is a widget of class shell 209, widget 315, which represents box 303 and has box class 210, and two children of widget 315, widget 317, which represents label 305 and has label class 207, and widget 319, which represents button 307 and has push button class 213. Widget tree 311 is implemented in the X window system by means of parent and child pointers, shown in dotted lines in widget tree 311. Each widget 125 has a child pointer (CHP) 321 to each of its children and a parent pointer (PP) 323 to its parent.

Limitations of Widgets 125

While the X Window system in general and widgets in particular have greatly simplified the programming of graphical user interfaces, there remain limitations which restrict the use of widgets for certain types of applications. There is first of all the fact that a widget's class is defined at compile time. The X window system provides no mechanism for defining classes at run time. Then there is the fact that the level of control provided by the callback routines is not fine enough. In particular, there is no way of defining callback routines which are associated with accesses to specific resources or of associating an existing callback routine with a particular condition. In the following, techniques for overcoming these limitations will be disclosed.

Widgets with Run-Time Classes: FIGS. 4–7

The interface which X intrinsics 117 provides to application programs 119 for the creation of widgets is the function XtCreateManagedWidget. FIG. 4 is a block diagram of that function 415. As may be seen there, function 415 takes four arguments:

a character-string name for the widget;

a pointer 407 to the class information for the widget's class;

a pointer 409 to the widget in widget tree 311 which is the parent of the widget being created;

a list of values for resources 127 for the widget being created; and the number of values on the list.

The list of values is a list of resource name-value pairs. The resource names, their types, and any default values are defined when the widget's class is defined.

Operation of XtCreateManagedWidget 415 is as follows: class pointer 407 is used to locate class information 419 for the new widget's class in class data base 417 maintained by X intrinsics 117. Class information 419 includes a pointer to superclass information 421(0) for the first superclass in the class hierarchy for the widget's class, superclass information 421(0) includes a pointer to the next superclass information 421 in the hierarchy, and so on through to superclass information 421(n), which will be for the core class. Function 415 obtains descriptions of all of the resources for the widget's class from class information 419 and the super class information 421 for all of the widget's superclasses. If another widget of the class has already been created, the resources have been "initialized", that is, put into a compact form suitable for the widget. If this is the first widget to be created, the resources are initialized at this point. Upon initialization, storage is allocated for the widget and the resources are copied into the widget's storage. Next, the list of arguments 411 is taken and the values of resources 127 whose names are on the list of arguments 411 are set to the values contained in the list. Finally, pointers are set in widget 125 to the widget's parent widget (parent pointer (PP) 423) and to its class information 419 (CLP 424) (this pointer is of course the pointer which was passed in as argument 407), and a pointer is set in the parent widget to the new child widget (child pointer (CHP) 425).

Figure 5:
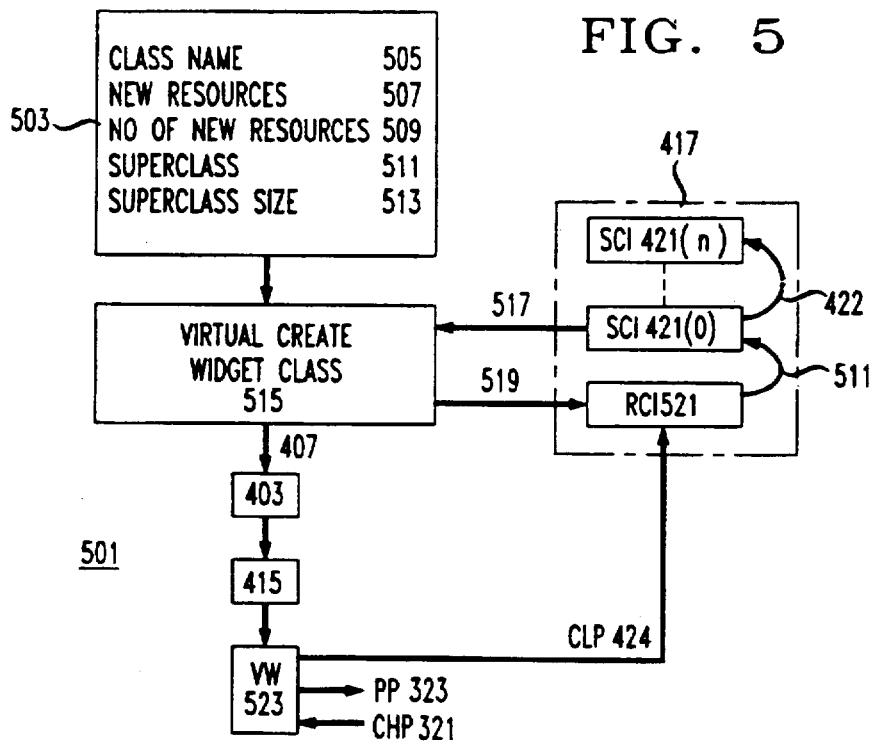
FIG. 5 is a diagram of the creation of a widget with a run-time class in an X window system.

An overview of the technique by which a widget's class may be defined at run time is shown in FIG. 5. A widget whose class is defined at run time is termed hereinafter a virtual widget. The run time definition of the widget's class is performed by the function VirtualCreateWidgetClass 515, which returns a pointer to a class 407, and can thus be used to provide pointer 407 in an invocation of XtCreateManaged Widget 415. The invocation of XtCreateManagedWidget 415 creates a virtual widget 523.

VirtualCreateWidgetClass function 515 takes four arguments 503:

Class name 505: the name of the virtual widget's class;

New Resources 507: a pointer to a list of the new resources which are being added to the class;

No. of new resources 511: the number of items on the list of new resources;

Superclass 511: A pointer to superclass information 421 for the class of which the virtual widget's class is will be an immediate subclass; and Superclass size 513: the size of superclass information 421.

X intrinsics 117 provides functions which, when given a class pointer, return the information for the class, and which, when given the class pointer, return the size of the class information.

In overview, function 415 does the following:

It uses superclass pointer 511 to locate superclass information 421;

It uses superclass information 421 and arguments 505, 507, and 509 to create run-time class information (RCI) 521, which as far as X intrinsics 117 is concerned is indistinguishable from compile-time class information 419;

It sets the size for the widget so that it is large enough to hold the data required for the new resources specified for the class;

It returns a pointer to run-time class information 521. That pointer can be used as class pointer 407 in an invocation of XtCreateManagedWidget.

Figure 6:
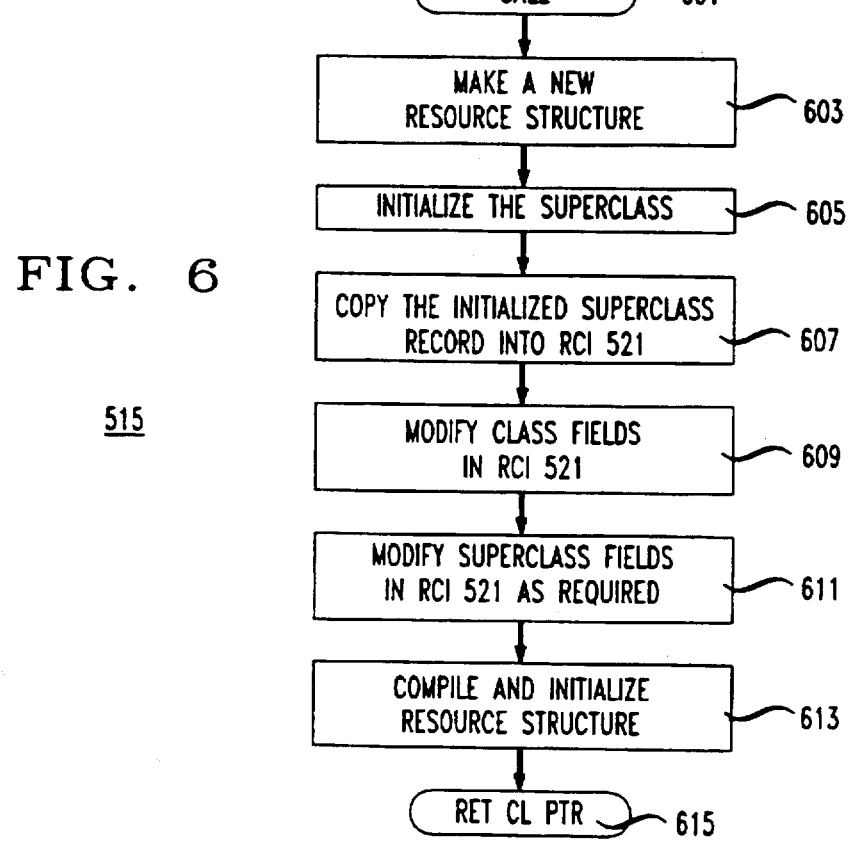
FIG. 6 is a flowchart for VirtualCreateWidgetClass function 515.

Operation of VirtualCreateWidgetClass 515 is shown in more detail in the flowchart of FIG. 6. The first step following call 601 is making a structure to hold the list of new resources (603). In a preferred embodiment, the list always includes monitor functions and callback tester functions, followed by any other new resources which the programmer wishes to define for the virtual widget's class. The size of the structure is of course determined by argument 509, no. of new resources. The next step (605) is to use a function provided by X intrinsics 117 to initialize the superclass specified by superclass pointer 511. The function, XtInitializeWidgetClass, takes superclass pointer 511 as an argument, obtains the class information from the superclass from superclass information 421 for the superclass and from superclass information 421 for any class of which the superclass is a subclass and puts all the class information into a form in which it can be copied into a widget belonging to the class. To do the latter, it calls all of the necessary X intrinsics initialization functions and compiles the resource lists.

Thereupon, the initialized superclass information is copied into run-time class information 521 for the virtual widget (607) and fields in run-time class information 521 are modified as required to add the new resources to the run-time class information and to ensure proper behavior of virtual widgets 523 belonging to the run-time class (609). Run-time class information 521 includes information about the new class's superclasses, and if required, that information is modified in step 611. Details about both of these modifications will be given below. Finally, in step 613, VirtualCreateWidgetClass employs the X intrinsic function XrmCompileResourceList to compile the list of new resources and then initializes the compiled list. When VirtualCreateWidgetClass 515 is finished, it returns a class pointer to run-time class information 521.

Continuing with more detail about steps 609 and 611 of FIG. 6, run-time class information 521 contains the same fields as the equivalent compile time class information 419. Of these fields, two sets are relevant for the present discussion: those in the CoreClassPart structure, which is included in every widget's class information 419, and those in the ConstraintClassPart structure, which is included in class information 419 for widgets which are subclasses of the constraint class. Complete information about the CoreClassPart and the ConstraintClassPart may be found in the Asente-Swick reference; here, the discussion will be limited to the fields which VirtualCreateWidgetClass 515 modifies in run-time class information 521.

FIG. 7 shows the modified fields. Beginning with CoreClassPart 735, the modified fields are superclass 701, which is set to pointer 511, pointing to the first superclass information 421 for the class, class name 703, which is set to class name 505 for the new class, widget size 705, which is set to the size of the storage required for run-time class information 521, pointers to initialization callback routines 707–711, which are set to NULL, ensuring that any such initialization callback routines defined in the superclass will not be invoked, a pointer to the resource list 713, which is set to pointer 15 pointing to resource list 718 created by VirtualCreateWidgetClass 515, number of resources 715, which is set as required for resource list 718, XRM class 717, which is set to an identifier derived from the class name, and a pointer 723 to a destroy callback routine which is invoked when the widget is destroyed.

The last two fields require more discussion. In the X Window System, resource values are set by the X intrinsic function XtSetValues and are read by the X intrinsic function XtGetValues. A widget designer may define XtGetValues and XtSetValues for a widget. To do so, the designer places pointers to functions which the widget designer has written in set values field 725 and get values field 730 respectively. In the case of a virtual widget 523, it is these functions which relate accesses to the new resources to changes in the widget state. In a preferred embodiment, pointer 727 points to a VirtualSetValues function 729 and pointer 732 points to a VirtualGetValues Function 731, which will be discussed in detail below. In the preferred embodiment, every virtual widget 523 employs functions 729 and 731; however, in other embodiments, these pointers could be passed in as arguments to VirtualCreateWidgetClass function 515 and different classes of virtual widgets could have different functions 729 and 731.

If virtual widget 523's class is a subclass of a constraint class, runtime class information 521 will contain one or more ConstraintClassParts. One of these is shown in FIG. 7 at 737. ConstraintClassParts include chained callbacks, that is, if a widget class is a subclass of a constraint class, certain callbacks in all of the ConstraintClassParts 737 in run-time class information 521 are executed in the order of the constraint classes in the class hierarchy, beginning either with the highest or lowest constraint class. The relevant callback functions are the Initialize function, specified in field 739, the Destroy function specified in field 741, and the set_values function specified in field 743. To prevent these callback function from being executed, VirtualCreateWidget Class function 515 starts at CoreClassPart 705 and locates each ConstraintClassPart 737 in turn and sets the pointers in fields 739–743 to NULL. These pointers point to Initialize, Destroy, and Set_values functions for each Constraint Class.

Widgets with Callback Tester and Monitor Functions: FIGS. 7–10

In standard X Window systems, the only callback functions which are invoked when an application program 119 invokes an XtSetValues or an XtGetValues function are the functions defined by the widget designers for those X intrinsics functions. What is needed is a technique for providing fine-grained control over what happens in a widget 125 when a resource is accessed. In a preferred embodiment, the new resources defined for virtual widgets 523 are used to achieve such fine-grained control.

The control is achieved by use of monitor functions and callback tester functions. A monitor function is a function which is associated with a specific resource and invoked whenever the resource is accessed, i.e., whenever an application program 119 calls XtSetValues or XtGetValues with a list of resources including the resource with which the monitor function is associated. A tester function is a function which is associated with one or more of the widget class's callback functions. Each time the value of any resource belonging to the widget is changed, i.e., each time an application program calls XtSetValues, the tester function performs a test. If the result of the test so indicates, the associated callback functions are executed. The test may involve any data accessible to the tester function.

FIG. 7 gives an overview of the manner in which this technique is implemented in virtual widgets 523. As shown there, run-time class information 521 includes resource list 718. Resource list 718 in a preferred embodiment has three parts: a list of monitor functions 719, a list of callback tester functions 721, and a list of other resources 720. As with any other widget resource, the monitor functions on list 719 and the callback tester functions on list 721 are placed on the lists by execution of XtSetValues by an application program 119. Monitor functions in list 719 may be associated with any of new resources 507 for virtual widget 523's class. The callback tester functions in list 721 may perform tests involving any data accessible to the given callback tester function.

Figure 9:
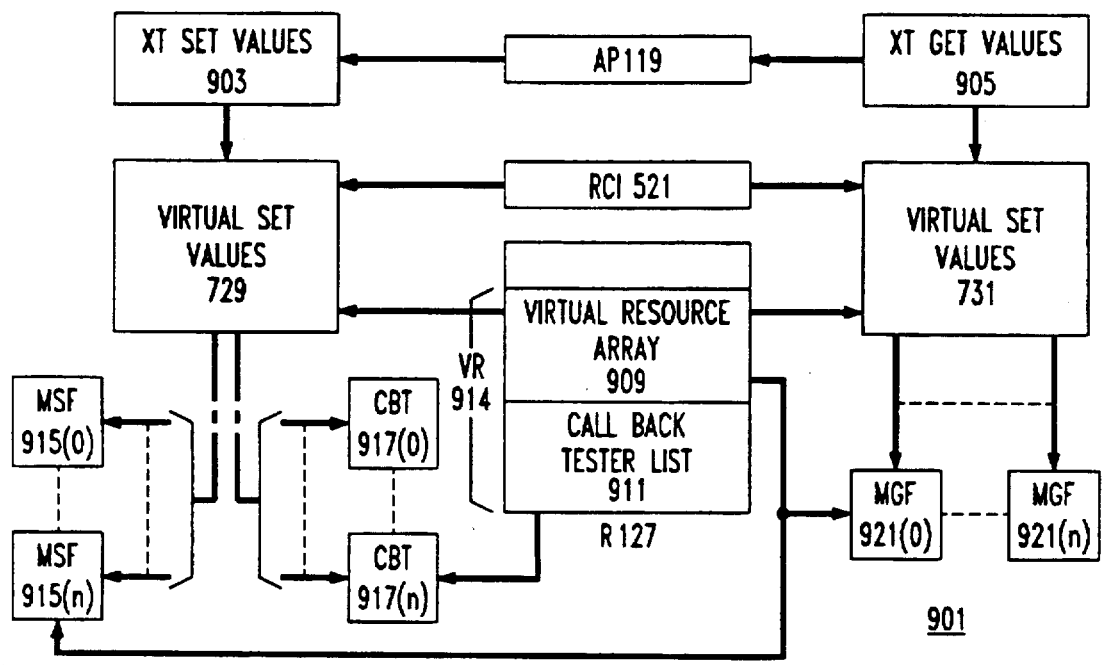
FIG. 9 is a diagram giving an overview of the operation of the VirtualSetValues function and the VirtualGetValues function in a preferred embodiment.

Invocation of the functions in lists 719 and 721 is handled by VirtualSetValues function 729 and VirtualGetValues function 731, which, as previously explained, are executed whenever an application program 119 invokes XtSetValues or XtGetValues respectively to set or examine the values of the widget's resources. An overview of the operation of these functions and their relationship to resources 127 and to the tester and monitor functions is shown in FIG. 9. Virtual resource management apparatus 901 includes application program 119, the X intrinsic XtSetValues function 903, the X intrinsic XtGetValues function 905, the VirtualSetValues function 729, the VirtualGetValues function 731, resources 127, monitor setvalue functions 915, monitor get value functions 921, and callback test functions 917.

Included in resources 127 are virtual resources 914 for virtual widget 523. Virtual resources 914 are of course defined in run-time class information 521. There are two parts to virtual resources 914: a virtual resource array 909 containing one entry for every virtual resource, and a list 911 of the call back tester functions. Array 909 and list 911 may be set and read by means of XtSetValues 903 and XtGet values 905 respectively.

Operation is as follows: if application program 119 invokes XtSetValues with a list of resources which includes virtual resources, XtSetValues invokes VirtualSetValues 729, the set values function for virtual widget 523's class, to process the virtual resources. In the simplest case, the virtual resource being set is neither a monitor function nor a callback tester function. In that case, virtual set values function 729 uses runtime class information 521 to locate the entry for the virtual resource in virtual resource array 909. If the entry indicates that there is a monitor set value function 915 which is to be executed when the value of the resource is set, that monitor function 915 is executed. After any such monitor function 915 has been executed, the resource is set. Then any callback tester functions 917 on call back tester list 911 are executed, and if any tests are true, the callback function associated with the callback tester function is executed. If the virtual resource being set is the list of monitor functions, VirtualSetValues 729 updates the data for the monitor functions in virtual resource array 909; if the virtual resource being set is callback tester list 911, VirtualSetValues 729 updates that list.

If an applications program 119 invokes XtGetValues 905 with resources including virtual resources, X intrinsics 117 invokes VirtualGetValues for the virtual resources. For each virtual resource, VirtualGetValues uses runtime class information 521 to locate the virtual resources in virtual resource array 909, executes any associated monitor set value function 921, and returns the values of the virtual resource. Since the values of the virtual resources did not change, no callback test functions are run.

FIG. 8 provides details of data structures used by VirtualGetValues 731 and VirtualSetValues 729. When the virtual resource being set is callback tester list 911, VirtualSetValues 729 requires a list of callback tester functions. Data structure 801 is an element of that list: there are four fields: the name 803 of the list of callback functions to be called if the test is true, a pointer to data for use by the function, a pointer to the callback tester function 917 which will invoke the callback function, and a pointer to the next element of the list of callback tester functions. Data structure 811 is an element of callback tester list 911; fields 813, 815, and 817 correspond to fields 803, 805, 807; callback name ID 819 is an identifier for the callback function specified by field 813; and next field 821 is a pointer to the next element in list 911.

Similarly, when the virtual resource being set is monitor functions 721, VirtualSetValues 729 requires a list which specifies the virtual resources for which monitors are to be provided and the monitors. Data structure 823 shows an element of that list. Field 825 contains the name of the resource, field 827 contains a pointer to client data for the get value monitor, field 829 contains a pointer to the get value monitor function, fields 831 and 833 contain analogous values for the set value monitor function, and field 834 contains a pointer to the next element in the list.

VirtualSetValues 729 uses this information together with information from resource list 718 to set values in virtual resource array 909. Resource list 718 is an array, with one resource list entry 839 for each resource. Included in the entries are a resource name identifier 841 and a resource type identifier 843 for the resource's name and type. Virtual resource array 909 is parallel to resource list 718. There is a virtual resource array entry (VRAE) 846 corresponding to each entry in resource list 718, and the corresponding VRAE 845 contains the values associated with the resource to which the entry in resource list 718 belongs. Virtual resource array entry 846 contains 5 fields; four of those, fields 847–853, contain the corresponding values from fields 827–833 for the resource specified in resource name field 825; the fifth field contains the current value of the resource.

Figure 10:
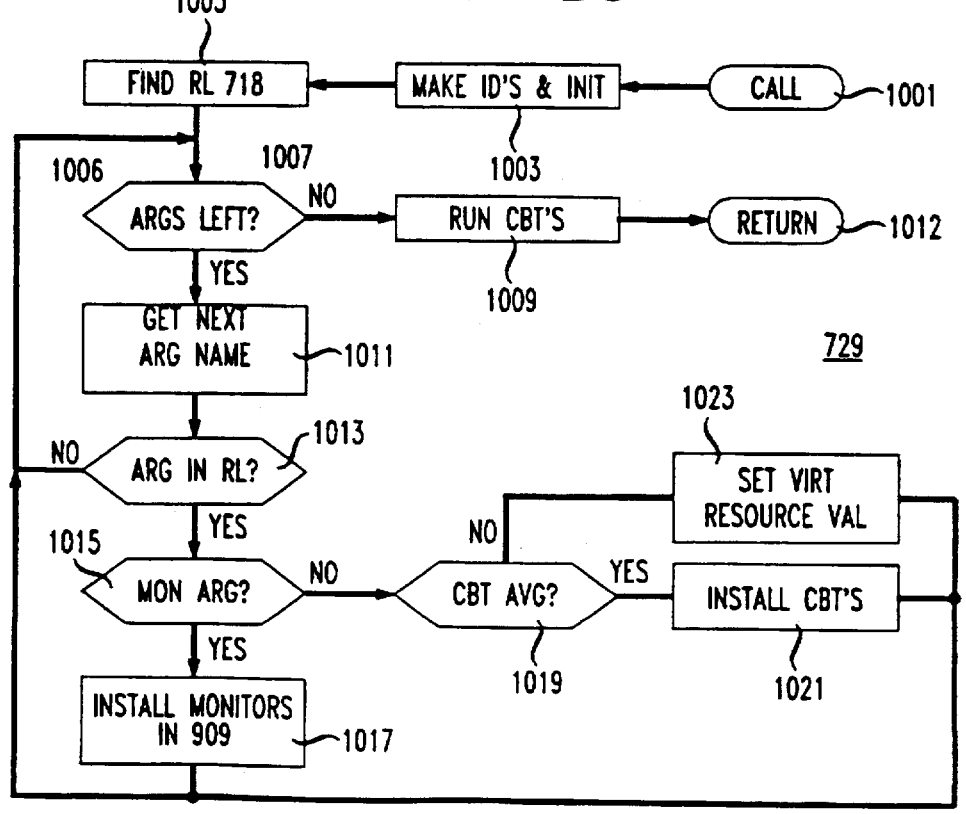
FIG. 10 is a flowchart of the VirtualSetValues function.

FIG. 10, finally, is a detailed flow chart for VirtualSetValues 729. The arguments for the function are those specified by X intrinsics 117 for a class's set value function. They are three widget pointers, a pointer to a list of arguments, and the number of arguments on the list. The three widget pointers point respectively to a copy of the widget whose resources are to receive new values, a copy of the widget in which changes have been made up to the point at which the class's set value function is invoked, and a copy of the widget with the actual changed values.

Beginning with call 1001, the first step is to make sure that virtual widget 523's run-time class information exists and 521 has been properly initialized (1003). If the run-time class information does not exist, the function returns. The next step is to find resource list 718 for the virtual widget 523. The remainder of the function is a loop 1006 which determines for each resource in the list of arguments whether that resource is in resource list 718, and if it is, performs the necessary modifications in virtual resource array 909.

Decision block 1007 determines whether there are any arguments left to process; if not, all of the resources have been set and callback tester functions 917 on callback tester function list 911 are executed (1009). When that is done, the function returns. If there are, the next argument is processed as follows: first, its name is obtained from the argument list; then resource list 718 is checked to determine if the name is in the list (1013); if it is, its type is examined to determine if the resource represented by the name is the list of monitors (1015). If it is, the monitors are installed in virtual resource array 909. That is done in a loop which does the following for each entry 823 on the list of monitors to be installed: it uses resource name 825 from entry 823 in resource list 718 to locate virtual resource array entry 846 for the resource; it then sets fields 847, 849, 851, and 853 from fields 827, 829, 831, and 833 of the list element When the monitors are installed, execution of loop 1006 begins again.

If the resource being set is not monitor functions 719, VirtualSetValues function 729 checks to see whether it is the callback tester functions 721 (1019). If it is, the callback tester functions are installed in callback tester function list 911 of virtual resources 914 (1021). Installation is done by using information in the list elements 801 of the argument to make list elements 811 for callback tester list 911. Callback tester list 911 containing the new list elements 811 replaces the old callback tester list 911. When the list has been installed, execution of loop 1006 begins again.

Resources that are neither monitor function lists nor callback tester function lists are set at box 1023. Before the resource is set, the monitor function specified in set value monitor 853 is executed; thereupon, the value of the resource is set as specified in the argument for the resource. When this is done, execution of loop 1006 begins again.

VirtualGetValues function 751 takes as arguments a pointer to a widget, a list of resources whose values are to be read, and an indication of the number of items in the list. In substance, VirtualGetValues 751 contains boxes 1003, 1005, 1007 and 1011 of FIG. 10, but the loop which is equivalent to loop 1006 contains only boxes 1007, 1011, and a box in which the value of the specified virtual resource is read. When all of the arguments have been read, the function simply returns with the values of the resources specified in the arguments.

While it is convenient to implement callback test functions and monitor functions using virtual widgets 523, it would also be possible to implement them in ordinary widgets 127 by simply adding monitor lists and callback test function lists to the resources in the core widget type and adding code to the set and get value functions for the core widget type which set the monitor lists and callback tester lists and responded to sets and gets of ordinary resources in the manner just described for virtual resources.

Virtual Widgets and Ordinary Widgets

From the point of view of X intrinsics 117, virtual widgets 523 are indistinguishable from ordinary widgets 125. Run-time class information 521 can be read in exactly the same fashion as class information 419, and the same operations can be performed on virtual resources 914 for a virtual widget 523 as can be performed on resources 127 for an ordinary widget. For example, a virtual widget 523's class may serve as a superclass for a new subclass in exactly the same fashion as an ordinary widget's class. Indeed, the class of one virtual widget 523 may be a subclass of another virtual widget 523.

Using Widgets to Represent Clients and Servers: FIGS. 11-14

As previously mentioned, some difficulty has been encountered in interfacing systems made up of cooperating processes to the X Window System. FIG. 11 presents an overview of a solution to that difficulty. System 1101 is made up of a server process 1103 and a number of client processes 1107(0) through 1107(n). Server process 1103 can provide interprocess communications (IPC) 1105 to its client processes 1107 and receive interprocess communications 1105 from its client processes 1107. An example of an application for a system such as system 1101 is a system in which a cursor position provided by one process is used by a group of other processes, each of which controls a window. In such a system, when a user moved a mouse which was providing inputs to the first process, the cursor would simultaneously change position in each of the windows controlled by the other processes. In the implementation, a client process or the server process itself would receive the cursor position information, and the server process would provide the information to the other processes.

In system 1101, each of the client processes 1107 and the server process 1103 are represented by widgets 125 belonging to an X Window System executing in server process 103. The widgets make up a tree, with client widgets 1111 (0..n) corresponding to client processes 1107(0..n) being children of server widget 1109, which corresponds to server process 1103. As will be explained in more detail below, IPC communications between processes 1103 and 1107 are modelled as XtGetValues and XtSetValues operations on resources in widgets 1109 and 1111 which represent the messages.

For example, a program running in one client process 1107 can communicate with other client processes 1107 by sending an IPC message to server process 1103. The arrival of the message in server process 103 produces a change of state in server widget 1109 which has two consequences: resources in server widget 1109 which represent the incoming message are set to the message's value and one or more callback functions on a callback list are invoked. One of the callback functions thus invoked does an XtGetValues function to retrieve the message; it then processes the message to produce a message of the form required by control processes 1107 and invokes an XtSetValues function for each of the client widgets which writes the message to an outgoing message resource in the client widgets. The set value function for each client widget 1111 then makes an IPC 1105 out of the message and sends it to client process 1107. It should be pointed out at this point that a client process 1107 may itself be a server with client processes. Such a client process will be represented by two widgets: a client widget in the widget tree of its server process and a server widget in the widget tree of its own process.

In a preferred embodiment, server and client widgets have been defined which are based on the "form" class provided in the Athena widget set. For a description of this class, see Peterson, Chris D., "The Athena Widget Set-C Language Interface," *X Window System, X Version* 11, Release 4. FIG. 12 shows the additional resources and callbacks which are defined in a preferred embodiment for server widget class 1201. The new resources fall into five groups:

- server setup resources 1202, which contains the information necessary to identify the server to the interprocess communications system;
- server callbacks 1206, which contains callbacks which are executed upon certain changes of state in widgets having server class 1201;
- server visible data structures 1212, which is a pointer to the data structure which represents the server;
- incoming message 1212, which is the structure which represents a message received by the server widget from a client widget; and
- outgoing message 1222, which is the structure which represents a message sent by the server widget to a client widget.

Continuing in more detail with server setup resources 1202, the two resources in that group are XtNserverHostName 1203, which identifies the processor on which server process 1103 is executing and XtNserverEnvironmentName, which identifies the IPC system being used.

Server callbacks 1206 includes callbacks for three conditions. XtNserverNewClient 1207 is executed when an IPC message from a new client is received; XtNserverDeadClient 1209 is executed when a response to an IPC message to a current client indicates that the current client is dead; XtNserverRecvMessage 1211, finally, is executed whenever an IPC message 1105 is received from a client process 1107. Server visible data structures 1212 in a preferred embodiment is a pointer, XtNserverPointer 1213, to a data structure which represents server process 1103.

Incoming message 1214 includes a resource for every field of the kind of IPC message 1105 used in a preferred embodiment. As can be seen from the resources, IPC message 1105 has four fields: a type field, a client identifier field, a message length field, and a field which contains the message itself. In the preferred embodiment, there are system-defined types for client management messages and debugging messages, but the types are otherwise defined by the application sending and receiving the messages. The names of resources 1215–1221 indicate which fields of the incoming messages are represented by the resources. Outgoing message 1222 similarly has a resource for each field of the IPC message, and the names of these resources 1223–1229 indicate which field is represented by each resource.

The resources of the process widget class, used to represent client processes, are shown in FIG. 13. This class 1301 is generally similar to server class 1201. Setup resources 1303 specify the operating system command used to cause the process to be created (in this case, the "sh" command of the UNIX operating system) and the identifier used to identify the process to the server widget 1109. There are two callback function 1305; XtNprocessDeadClient is executed when client 1107 represented by client widget 1111 dies and XtNprocessRecvMessage is executed when server process 1103 receives a message from the process 1109 represented by client widget 1111. XtNprocessPointer 1307 corresponds to XtNserverPointer 1213 and is a pointer to the data structure which represents client process 1111.

Continuing with the resources for messages, resources 1309 are for messages sent by client process 1107 to server process 1103 (that is, "incoming" from the point of view of server process 1103). These resources represent all four fields of the IPC message, with XtNprocessInMessageClientId indicating client process 1107 which is sending the message.

Figure 14:
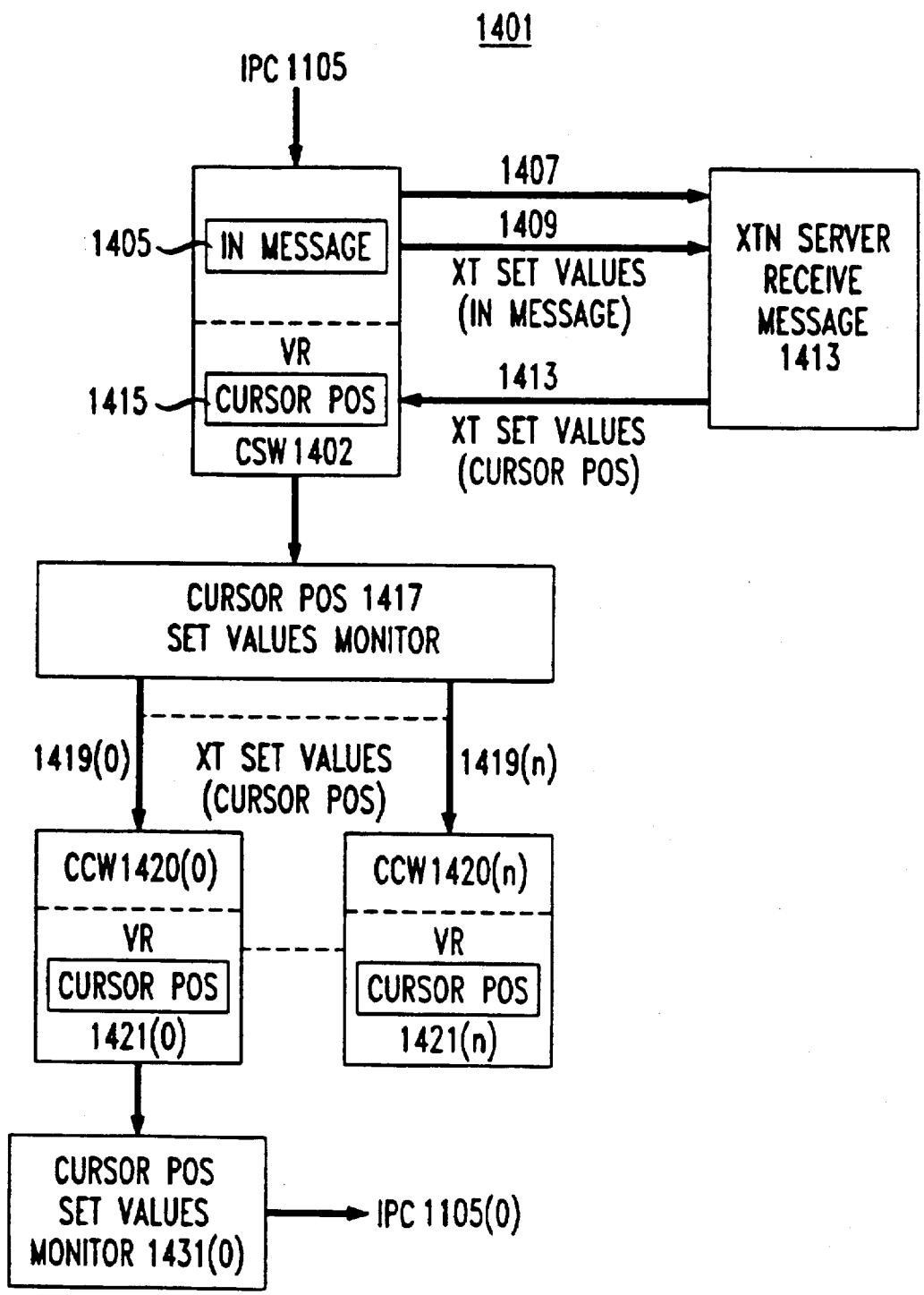
FIG. 14 is a diagram of the operation of a system which employs virtual widgets belonging to run-time subclasses of the server and process classes.

Run-time Subclasses of Server and Process Widgets: FIG. 14

While widgets having server class 1201 and process class 1301 can be used as they stand to represent and control server processes 1103 and client processes 1107, their usefulness is greatly increased if run-time subclasses of these classes are made and virtual widgets 523 belonging to these run-time subclasses are used to represent the processes.

For instance, a set of server widgets 1109 and client widgets 1111 for implementing the cursor example mentioned above can be implemented by defining an IPC message type which specifies cursor data and then defining run-time subclasses of server class 1201 and process class 1301 which include the new resources needed to handle and propagate the cursor data.

In the cursor server subclass, a new callback function is added to the list of XtNserverRecvMessage callbacks. The new callback function responds to an XtSetValues operation by checking the type of the incoming message and if the type is cursor data, uses XtSetValues to set the cursor position resource. The following resources may also be added:

- a cursor position resource, whose value is the cursor position.
- a server set values monitor for the cursor position resource which uses XtGetValues to get pointers to client widgets 1111 (the form class is a subclass of the composite class) and then uses XtSetValues to set the cursor position in each of the client widgets 1111.

In the cursor client subclass, the following resources may be added:

- a cursor position resource;
- a client set values monitor for the cursor position resource which transforms the value which has just been written to the cursor position resource into an inter-process communication 1105 which the monitor sends to client process 1105(n) corresponding to the client widget 1111.

FIG. 14 shows how the above components cooperate to provide a cursor position to a number of client processes 1109. When an IPC 1105 is received, the XtNServerRcvMessage callback 1411 is run, as indicated by arrow 1407; it in turn invokes XtGetValues on In Message 1405, as indicated by arrow 1409 to get incoming message 1405. If type resource 1215 in the message indicates cursor data, XtNserverRecvMessage 1411 invokes XtSetValues to set cursor position resource 1415, as indicated by arrow 1413. Set value monitor 1415 defined for cursor position resource 1415 then gets pointers to each of the cursor client widgets 1420 and does XtSetValues on cursor position resource 1421 in each cursor client widget 1420. The cursor position set values monitor 1423 defined for each of the client cursor position widgets 1420 responds to XtSetValues by using the cursor data in cursor position 1421 to make a cursor position inter-process message 1105 to client process 1107 corresponding to client cursor widget 1420.

As can be seen from the foregoing, any kind of interprocess communication between a server process 1103 and a client process 1107 can be dealt with by defining a type for the message, defining a resource in the run-time subclass which can be set with the message's data, defining a XtNserverRecvMessage callback which responds to the type by setting the resource, defining a monitor on the resource which propagates the data to the relevant virtual widgets, and defining another monitor which properly handles the propagated data in the widgets to which it has been propagated.

Conclusion

The foregoing Detailed Description has disclosed to one of ordinary skill in the art how an object's class may be defined at run time. More specifically, it has disclosed how one may make and use a virtual widget for use in the X Window System which has a class which is defined at run time. It has further disclosed how widgets may be made which invoke monitor functions when specific resources are accessed and which invoke callback tester functions which respond to a modification of any resource by performing a test. If the test succeeds, callback functions associated with the callback tester functions are invoked. The Detailed Description has finally disclosed how widgets may be used to represent and control processes and servers and how virtual widgets are particularly advantageous in such systems.

As will be apparent to those of ordinary skill in the art, the principles of the techniques disclosed herein may be employed in object-oriented programming systems other than the X Window System, the techniques may be implemented in other ways within the X Window System itself, and virtual widgets may be employed in contexts other than those disclosed herein. For this reason, the Detailed Description is to be considered as being all respects illustrative and exemplary, but not restrictive, and the scope of the invention is defined solely by the claims as interpreted in light of the doctrine of equivalents.

What is claimed is:

1. A widget (523) for use in an X window graphical user interface system, the widget being characterized in that:

the widget is a software object stored in a computer readable medium and represents a window which may be displayed on a display; and the widget's resources include a first resource (713) which is first defined at run time.

2. The widget set forth in claim 1, further characterized in that:

the widget's resources include a set of further resources (720) which are defined at run time;

the first resource is a monitor function (719) which is associated with one further resource of the set of further resources and which is invoked when the one further resource is accessed.

3. The widget set forth in claim 2 further characterized in that:

there are a plurality of the monitor functions.

4. The widget set forth in any claims 2 or 3 further characterized in that:

the monitor function includes a first monitor function which is invoked when the one further resource is read and a second monitor function which is invoked when the one further resource is modified.

5. The widget set forth in claim 1 further characterized in that:

the widget's resources further include one or more callback functions and a set of further resources which are defined at run time; and the first resource is a callback tester function which performs a test whenever any of the set of further resources is modified and which is associated with a set of the callback functions, the callback functions in the set being invoked if the results of the test so indicate.

6. The widget set forth in claim 5 further characterized in that:

the test may be made on any value accessible to the callback tester function when the callback tester function performs the test.

7. The widget set forth in any of claims 5 or 6 and further characterized in that:

there are a plurality of the callback tester functions.

8. A method of making a widget for use in the X window system, the widget belonging to a first class which is a subclass of a second class and the method comprising performing the steps in a computer system at run time of:

receiving a definition of the second class;

receiving a definition of a set of resources;

making a definition of the first class from the definition of the second class and the definition of the set of resources; and creating the widget according to the definition of the first class.

9. The method set forth in claim 8 further characterized in that:

the step of making a definition of the first class includes the steps of putting the definition of the second class into a form such that an object of the second class may be created; and making the definition of the first class from the form and the definition of the set of resources.

10. A widget (523) for use in an X window system which is characterized in that:

the widget is a software object stored in a computer readable medium; and the widget includes among its resources (735) a monitor function (719) which is associated with a given one of the resources, the association being such that the monitor function is invoked when the given resource is accessed.

11. The widget set forth in claim 10 further characterized in that:

there are a plurality of the monitor functions.

12. The widget set forth in any of claims 10 or 11 further characterized in that:

the monitor function includes a first monitor function which is invoked when the given resource is read and a second monitor function which is invoked when the given resource is modified.

13. A widget (523) for use in an X window system which is characterized in that:

the widget is stored in a computer readable medium; and the widget includes among its resource callback tester function(721) which performs a test whenever a resource belonging to a set thereof is modified and which is associated with a set of the callback functions, the association being such that the callback functions in the set are invoked if the test's results so indicate.

14. The widget set forth in claim 13 further characterized in that:

the test may be made on any value accessible to the callback tester function when the callback tester function performs the test.

15. The widget set forth in any of claims 13 or 14 further characterized in that:

there is a plurality of the callback tester functions.

16. A widget for use in the X window system which is characterized in that:

the widget is stored in a computer readable medium; and the widget includes resources (1214, 1222) representing an interprocess communication and means (1211) for relating operations on the resources to the interprocess communication.

17. The widget set forth in claim 16 further characterized in that:

the resources representing the interprocess communication represent data contained in the interprocess communication; and the means for relating operations on the resources to the interprocess communication include a callback function invoked in response to an XtSetValues operation which reads a portion of the data represented by the resources.

18. The widget set forth in claim 17 further characterized in that:

the resources representing the interprocess communication include first resources representing an incoming interprocess communication;

and second resources representing an outgoing interprocess communication.

19. The widget set forth in claim 18 further characterized in that:

the widget represents a server process which receives interprocess communications from and provides interprocess communications to client processes; and the callback functions further include a first callback function which is invoked when the server gets a new client process and a second callback function which is invoked when a client process dies.

20. The widget set forth in claim 18 further characterized in that:

the widget represents a client process which receives interprocess communications from and provides interprocess communications to a server process;

and the callback functions further include a callback function which is invoked when the client process dies.

21. The widget set forth in claim 16 further characterized in that:

the widget's resources further include a run-time resource which is defined at run time; and the means for relating operations on the resources employs the run-time resource.

22. The widget set forth in claim 21 further characterized in that:

the run-time resource includes a first run-time resource which may be accessed and a second run-time resource which is a monitor function associated with the first run-time resource, the monitor function being invoked when the first run-time resource is accessed; and the means for relating operations accesses the first run-time resource;

and the monitor function responds thereto by sending an interprocess communication.

* * * * *